United States Patent [19]

Jägers

[11] Patent Number: 4,621,857

[45] Date of Patent: Nov. 11, 1986

[54] MOTOR-VEHICLE TRAILER FOR TRANSPORTING REMOVABLE SUPERSTRUCTURES

[76] Inventor: Leopold Jägers, Rudolf-Diesel-Str. 1, D-5350 Euskirchen, Fed. Rep. of Germany

[21] Appl. No.: 735,956

[22] Filed: May 20, 1985

[30] Foreign Application Priority Data

May 22, 1984 [DE] Fed. Rep. of Germany ....... 3419026

[51] Int. Cl.⁴ ............................................. B62D 23/00
[52] U.S. Cl. .................................... 296/35.3; 296/10; 280/63; 280/789; 280/414.1
[58] Field of Search .................. 280/414 R, 63, 789; 296/35.1, 35.3, 10

[56] References Cited

U.S. PATENT DOCUMENTS

| | | | |
|---|---|---|---|
| 3,257,125 | 6/1966 | Roque | 280/414.1 |
| 3,266,836 | 8/1966 | Taylor | 280/414.1 |
| 3,524,659 | 8/1970 | Filter | 280/414.1 |
| 3,661,286 | 5/1972 | Smith | 280/414.1 |
| 4,417,765 | 11/1983 | Wirsbinski | 296/35.3 |
| 4,468,046 | 8/1984 | Rutherford | 296/35.3 |
| 4,489,977 | 12/1984 | Earing | 296/35.3 |

Primary Examiner—Robert R. Song
Attorney, Agent, or Firm—Karl F. Ross; Herbert Dubno

[57] ABSTRACT

The invention relates to a motor-vehicle trailer, particularly a passenger-car trailer, for transporting easily removable and exchangeable superstructures. Toward the rear of the trailer, two approximately horizontal rail sections, which are joined to each other at the front, diverge and in the area of the axle units extend rearwardly in a horizontal parallel manner. In front of and behind the axle units, the rail sections are joined by transverse sections, and between the transverse sections wheelguards are located. The upper areas of the wheelguards form supports which directly transfer the load of the superstructures via a suspension to the wheels mounted on the axle units.

13 Claims, 37 Drawing Figures

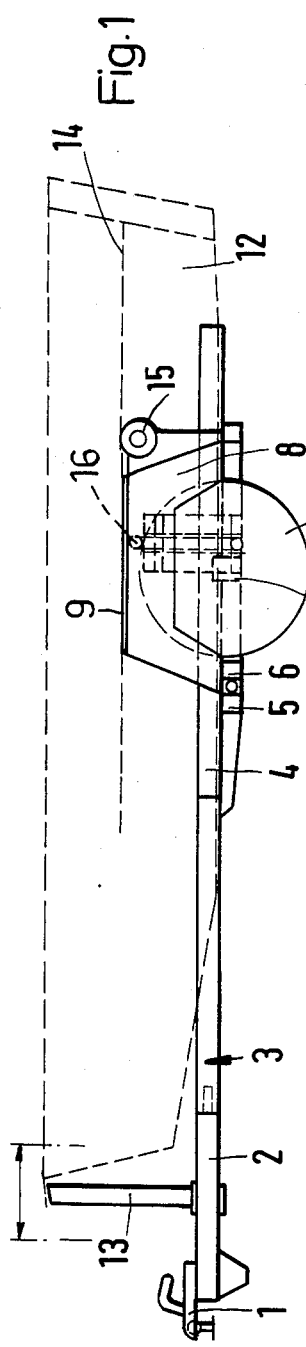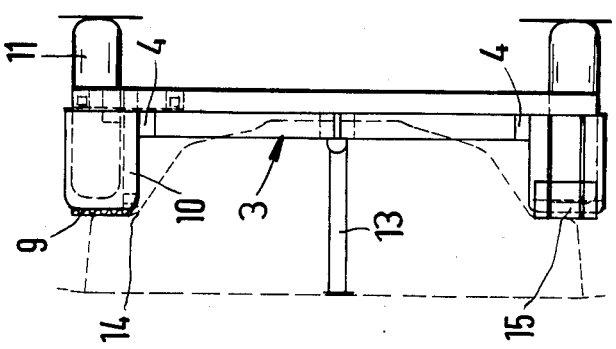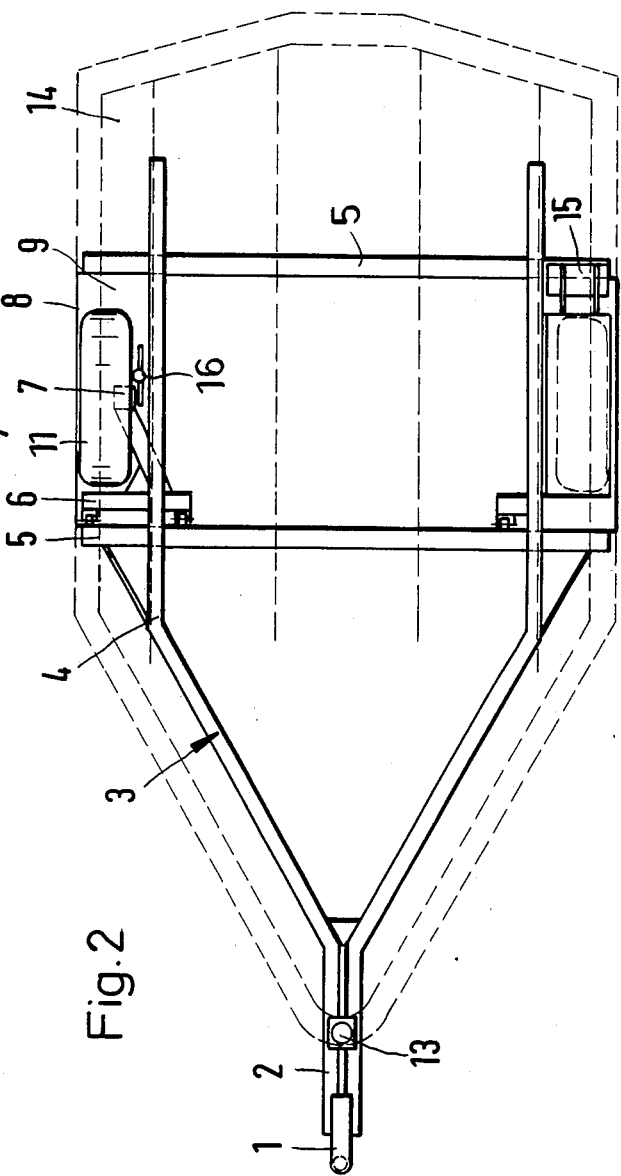

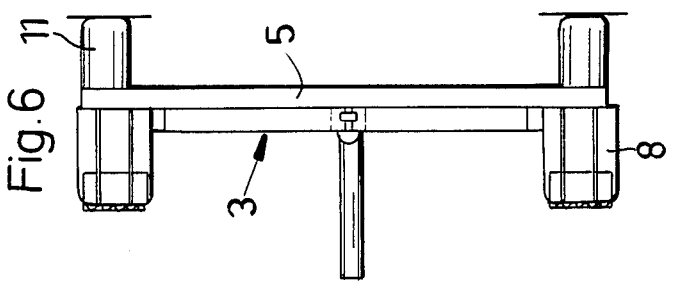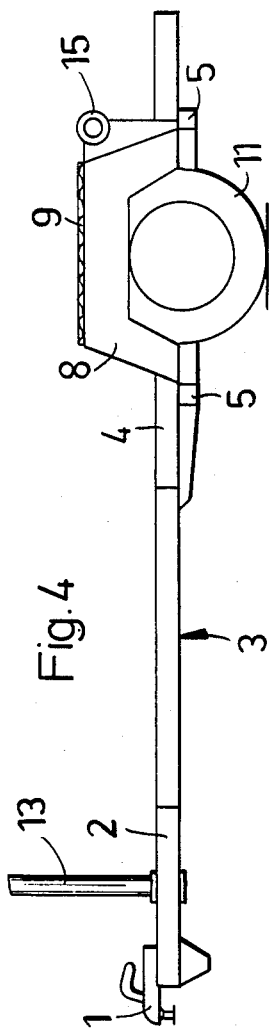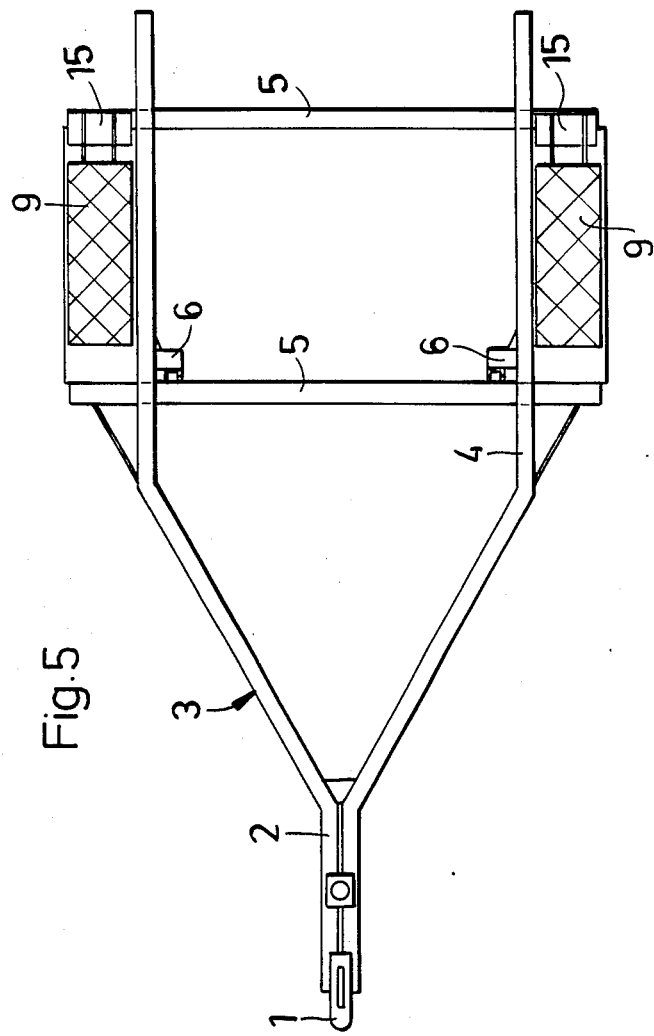

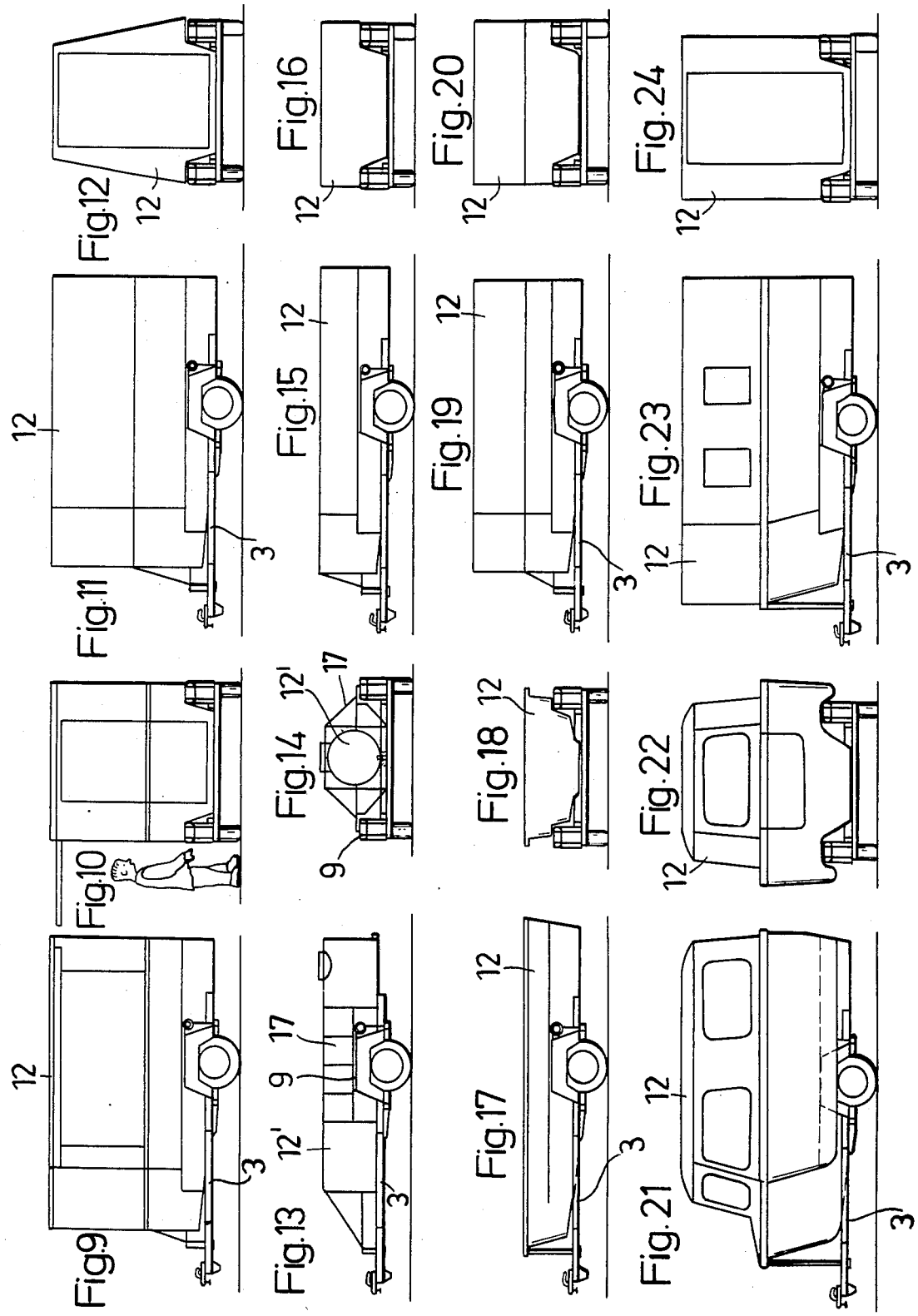

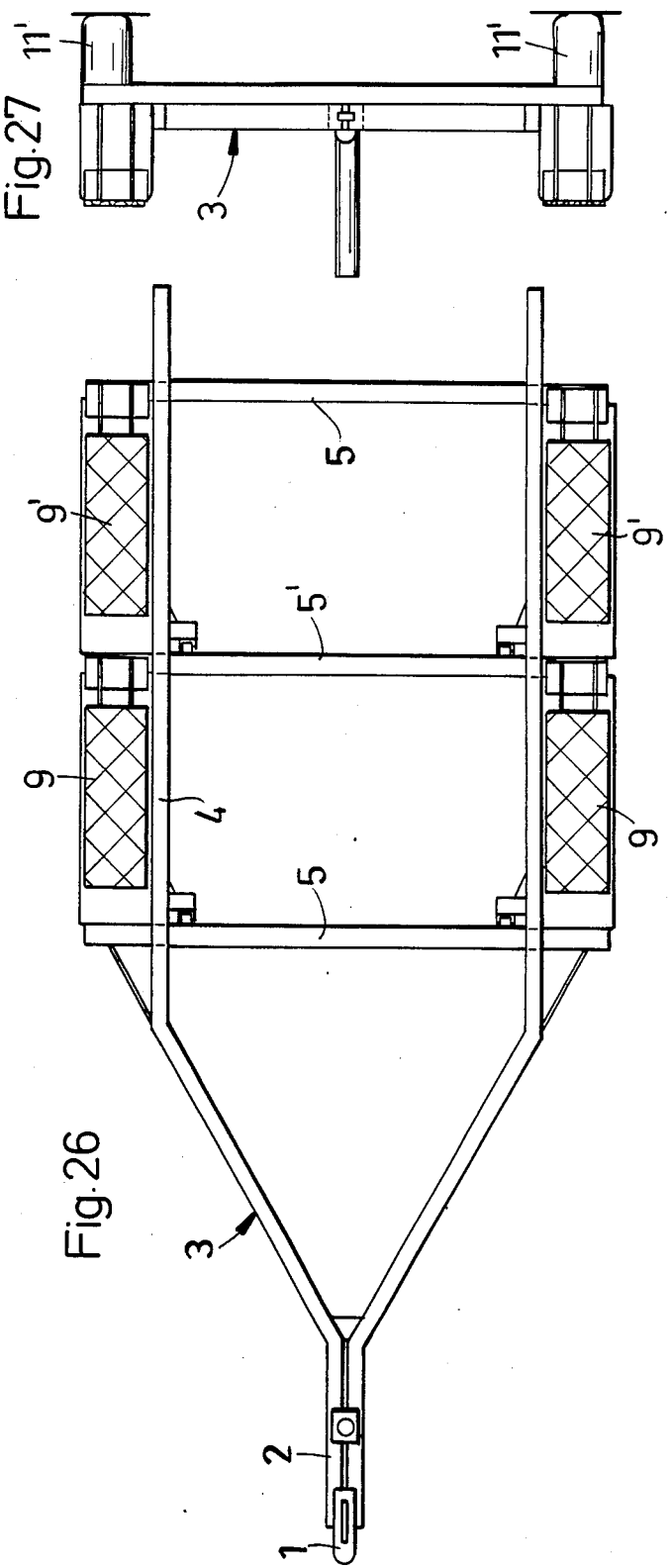

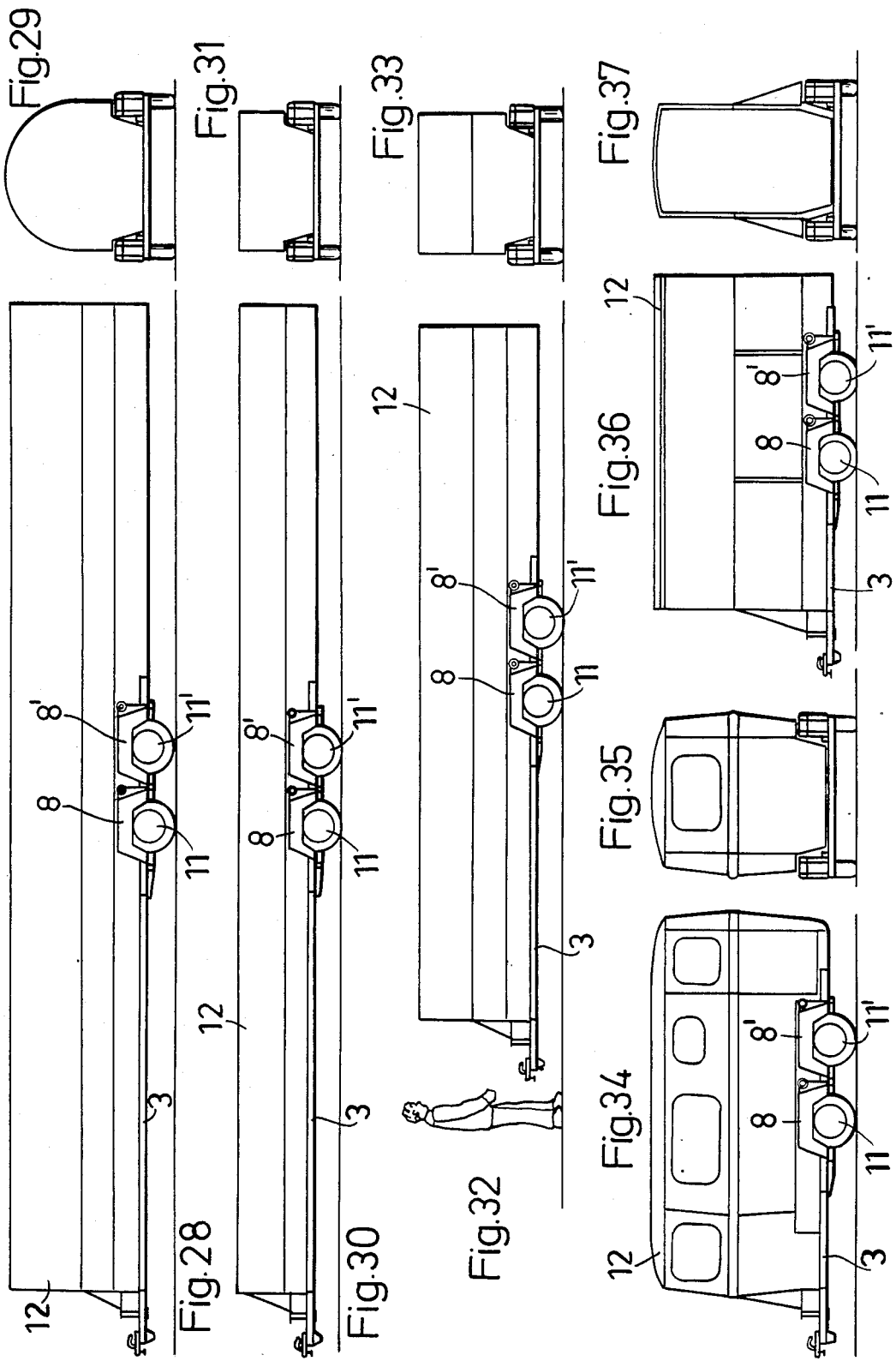

MOTOR-VEHICLE TRAILER FOR TRANSPORTING REMOVABLE SUPERSTRUCTURES

FIELD OF THE INVENTION

The invention relates to a motor-vehicle trailer, particularly a passenger-car trailer, for transporting easily removable and exchangeable superstructures or loads, for example boats, caravans, luggage containers or all types of containers for industry, in which arrangement two approximately horizontal sections, which are joined to each other at the front, diverge in the rearward direction and in the area of the axle units extend rearwardly in a horizontal parallel manner and these sections are joined in front of and behind the axle units by transverse sections, and between the transverse sections wheelguards are located.

BACKGROUND OF THE INVENTION

Trailers are known which allow for example a boat to be mounted on them in such a manner that it can be easily removed. In this arrangement, the trailer is designed in such a manner that the boat can be pulled, for example over rollers, onto the trailer and can be attached there. For this purpose, the most varied types of axles and suspensions are used. Similarly, many types of attachments exist for attaching the boat to the trailer.

However, the detailed construction usual for this arrangement uses considerable space and thus requires elaborate constructional parts which result in corresponding costs and, especially, have a heavy weight.

OBJECT OF THE INVENTION

It is the object of the present invention to design a combination between the chassis of the trailer and the load superstructure in such a manner that a simple and lightweight construction is produced which requires little space.

SUMMARY OF THE INVENTION

According to the invention, this object is achieved by the upper areas of the wheelguards forming supports which directly transfer the load of the superstructures via the suspension to the wheels.

This provides the possibility of an ideal combination between a trailer chassis and the various types of superstructures such as, for example, a boat, caravan, luggage containers and all types of containers for industry can be considered, with respect to their suitability and varied possible uses.

As a result of the special design of the chassis and superstructures, great common stability is achieved which leads to a large weight saving of the entire structure of, for example, 30% as compared to a conventional design.

A three-point-type load-bearing arrangement is made possible which simultaneously permits the load to be displaced in the longitudinal direction for the purpose of counterbalancing. This counterbalancing is necessary since the load, because of a maximum permissible bearing load, must be appropriately distributed relative to the trailer coupling of the traction vehicle and the wheels of the trailer.

Slipping of the load in operation is prevented by mounting devices, principally by quick-locking devices for faster handling which can be located not only at the front support but also at the lateral supports.

While being of light weight and simplest design, the trailer is of especially small construction since the thrust bearings are arranged directly above the wheels. This achieves the additional advantage that the load acting on the thrust bearings is transferred directly to the axle(s) without loading other components of the trailer. This makes it possible for the rail sections of the trailer to be of small cross-section.

Since the thrust bearings engage underneath longitudinal indentations or projections of the respective superstructure, thus ensuring the spacing of the thrust bearings from each other, it is not necessary to arrange an additional cross-link between the thrust bearings. Instead, the rigidity of the superstructure is utilised to provide this support.

The load of the superstructures is transferred via the longitudinal indentations in the latter and this load is directly transferred to the wheels via the suspension. This combination of chassis and superstructure forms a link which is easily detachable by appropriate design of the chassis and of the superstructures loaded thereon and thus makes it possible for the superstructures to be easily removed from the chassis and various superstructures to be easily exchanged.

The two lateral supports, together with a front support, make a three-point type transfer of the superstructure load possible. The superstructure is arranged to be displaceable, in the direction of vehicle movement, on top of the chassis due to an appropiate design of the longitudinal indentations over a certain length and due to a displaceable arrangement of the front support in the front parallel part of the towbar. This makes it possible to achieve a distribution of the load on the trailer, which is necessary because of the maximum permissible bearing load acting on the trailer coupling and the wheels of the trailer.

The rail sections of the towbar portion of the trailer can be tubular and provided internally with additional tubular sections nested inside one another and adapted to be extended from the towbar and retracted again to accommodate superstructures of different lengths. As an alternative to this, the towbar can be detachable and can be exchanged with towbars of different lengths. Further, the towbar can be provided with an additional section for accommodating braking and reversing devices and a rope winch mounted at the front end of the towbar for pulling the superstructures onto the trailer.

BRIEF DESCRIPTION OF THE DRAWING

Various embodiments of the invention are described in greater detail and are illustrated in the drawing, in which:

FIG. 1 is a side elevational view of a first single-axle embodiment according to the invention supporting a load;

FIG. 2 is a top plan view of the embodiment of FIG. 1;

FIG. 3 is a rear elevational view of the embodiment of FIG. 1;

FIG. 4 is a side elevational view according to FIG. 1, without a load;

FIG. 5 is a top view of the embodiment of FIG. 4;

FIG. 6 is a rear elevational view of the embodiment of FIG. 4;

FIG. 9 is a diagrammatic side view of the trailer supporting a booth;

FIG. 10 is a diagrammatic rear view of FIG. 9;

FIGS. 11 and 12 are diagrammatic side and rear views respectively of a livestock transporter;

FIGS. 13 and 14 are diagrammatic side and rear views respectively of a tank for liquids with an adaptor;

FIGS. 15 and 16 are diagrammatic side and rear views respectively of an open superstructure for general purposes;

FIGS. 17 and 18 are diagrammatic side and rear views respectively of a floatable boat-shaped container;

FIGS. 19 and 20 are diagrammatic side and rear views respectively of a closed superstructure for general purposes;

FIGS. 21 and 22 are diagrammatic side and rear views respectively of a houseboat;

FIGS. 23 and 24 are diagrammatic side and rear views respectively of a travelling workshop;

FIG. 25 is a side elevational view of a two-axle embodiment of the trailer chassis;

FIG. 26 is a top plan view of the embodiment of FIG. 25;

FIG. 27 is a rear elevational view of the embodiment of FIG. 25;

FIGS. 28 and 29 are diagrammatic side and rear views respectively of a transporter, especially for sailplanes;

FIGS. 30 and 31 are diagrammatic side and rear views respectively of an open transporter for elongated material;

FIGS. 32 and 33 are diagrammatic side and rear views respectively of a closed transporter for elongated material;

FIGS. 34 and 35 are diagrammatic side and rear views respectively of a caravan; and FIGS. 36 and 37 are diagrammatic side and rear views respectively of a horse trailer.

SPECIFIC DESCRIPTION

Figure 7:
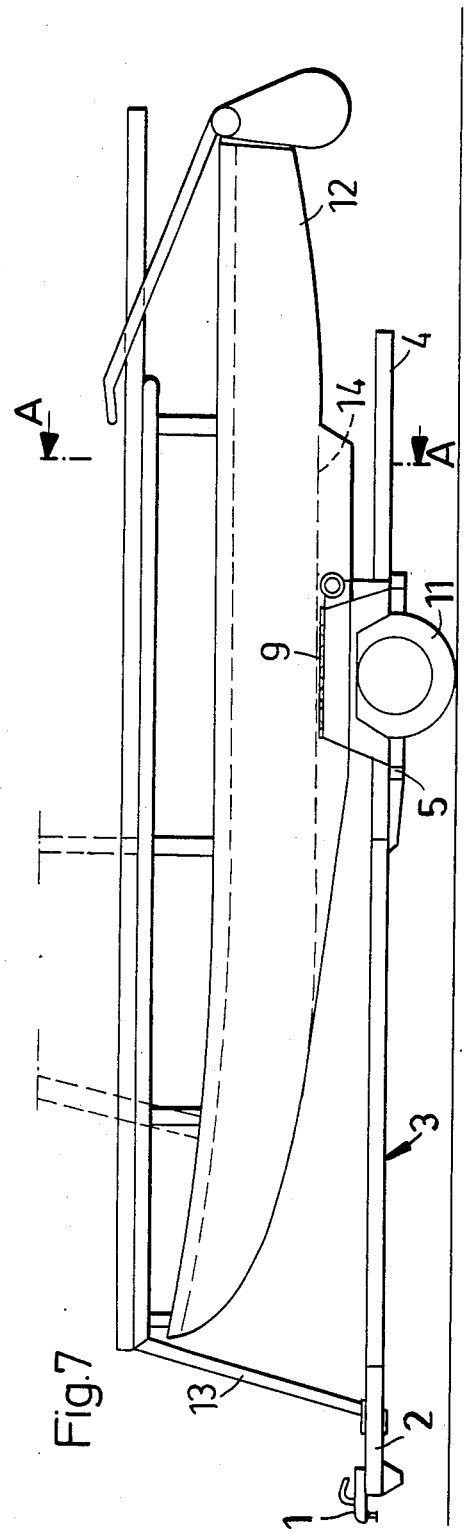
FIG. 7 is a side elevational view with a load laterally overhanging.
Figure 8:
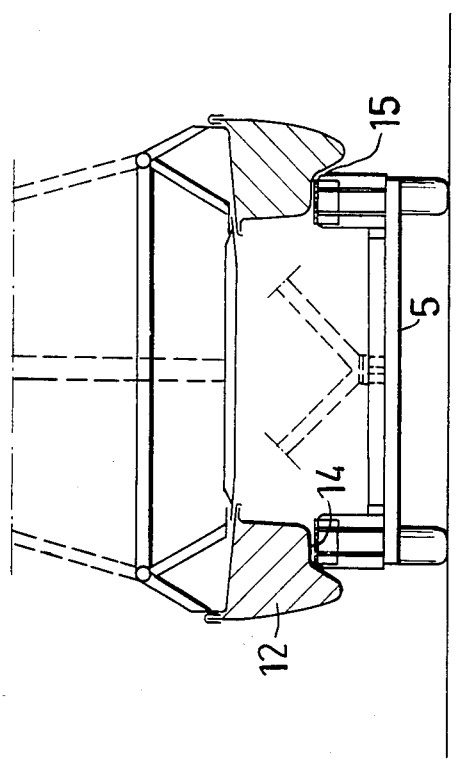
FIG. 8 is a sectional view taken along line A—A of FIG. 7.

The motor-vehicle trailer shown in FIGS. 1-8 is provided with two rail sections 3 which are bent at two locations and formed by steel tubes of rectangular or circular cross-section. In the front portion of the trailer, these two rail sections 3 extend close to one another and are parallel with each other in the longitudinal direction of the trailer and are attached to each other forming a towbar 2. At the front end of the towbar 2, a coupling, in particular a ball-and-socket coupling 1 is mounted. Behind the towbar 2, the rail sections 3 continue to be horizontal but are bent outwardly from the longitudinal axis of the trailer at an angle $\alpha$=approximately 30° and, after reaching approximately the greatest distance of the sections from one another are again bent by the same angle $\alpha$ so that in this rear portion 4 the sectins 3 are again parallel with each other and extend rearwardly. In this portion 4, sturdy wheel boxes 8 manufactured of steel plate are externally attached to the sections 3, which wheel boxes have in each case a horizontal level top with a length which is greater than its width and which is, in particular, rectangular. These tops form horizontal laterally arranged thrust bearings or supports 9, which are arranged in the direction of vehicle movement and are parallel and lie in the same horizontal plane with one another, for supporting the superstructures.

The sections 3 are joined to each other in front of and behind the wheel boxes 8 by transverse sections 5. The trailer obtains additional transverse rigidity by support by the thrust bearings 9 of the superstructure. For this purpose, the load formed by the superstructure 12 has lateral lower angular indentations or longitudinal projections 14 which are parallel and lie in the same horizontal plane with one another and are arranged at the same distance from each other as the two thrust bearings 9. The indentations 14 thus form lower lateral supports which are engaged underneath by the thrust bearings 9. In this arrangement, additional stability and security of the trailer is achieved by the fact that the superstructure is domed or hollowed out and concave in cross-section in accordance with the cross-section of the trailer.

At the rear portion 4 where the rail sections 3 have reached their maximum width, especially at the front transverse section 5, in each case a pivotable rocker 6 of a compound wheel fork axle 7 carrying two wheels 11 at the outside is coupled particularly at a transverse section. In this arrangement, the wheel axles 7 are joined to the wheel boxes 8 via shock-absorber legs 16 arranged approximately vertically and together form a suspension 10.

In the area of the towbar 2, a vertical support 13 is mounted on the sections 3, which support is displaceable in the longitudinal direction of the trailer and forms the front support (bearing) for the superstructure load. This results in a three-point bearing for the superstructure.

Behind the thrust bearings 9 vertically adjustable rollers 15 are mounted over which slide the lateral longitudinal projections 14 of the superstructures. The sliding effect can also be improved by a support of synthetic material instead of these rollers, which have the same width as the support surfaces 9, whereby superstructures having different cross-sectional profiles can be supported internally or externally of the cross-sectional outline thereof.

The illustrative embodiments shown in FIGS. 25 to 37 are particularly suited to extra long loads having a substantial rearwardly extending overhang and differ from those of FIGS. 9 to 24 by the fact that two axles are arranged and each of the four wheels 11 and 11' is covered with a respective wheel box 8 and 8'. In this arrangement, each wheel box forms a respective upper support 9 or 9' forming a thrus bearing. Between the two axles, the rails sections 3 are joined to each other by another transverse section 5'.

The embodiments of FIGS. 13 and 14 show a load 12' which has not been specifically designed for the chassis of the trailer but can be mounted thereon by means of adaptors 17 in the form of wings mounted on the load 12' and overhanging the support surfaces 9.

The trailer can accommodate the most varied superstructures, the bottom of which is in each case arranged very low on the trailer. Since the superstructures rest directly on the top of the wheel boxes, the distance between the superstructure and the top of the wheel is minimum which results in a very low total height of the superstructure and a low center of gravity.

I claim:

1. A motor vehicle trailer for transporting removable superstructures having a configuration compatable with said trailer comprising:
   a pair of substantially horizontal rail sections, said rail sections being joined at a front end thereof and diverging rearwardly over a first portion of the length of the rail sections, said rail sections extending rearwardly parallel to one another over a second portion of the rail sections to a rear end thereof;

at least first and second transverse sections spaced apart from one another and spanning said rail sections at said second portion thereof;

at least one pair of axle units disposed between said first and second transverse sections, each of said axle units being pivotally mounted at one of said transverse sections and carrying a respective wheel;

a respective wheelguard overlying each wheel and fixed to a respective rail section at said second portion, each wheelguard having an upper surface adapted to act as a support for said superstructures; and a respective suspension acting between each axle unit and a respective one of said wheelguards for directly transferring the load of said superstructure to each of said wheels.

2. The trailer defined in claim 1 wherein the superstructures are formed with longitudinally extending indentations forming shoulders which rest on the respective supports of said wheelguards.

3. The trailer defined in claim 1 wherein said rail sections extend parallel and adjacent one another over a third portion of the length of said rail sections at the front end thereof and defining a towbar, and a vertical support provided on said towbar and adapted to engage a forward end of said superstructures and forming with the support surfaces of said wheelguards a three-point transfer for the load of said superstructure.

4. The trailer defined in claim 1 wherein said vertical support is displaceable along said towbar in the direction of trailer travel.

5. The trailer defined in claim 4 wherein said superstructures are adapted to be displaceable in the direction of trailer travel along with said vertical support and relative to said supports of said wheelguards.

6. The trailer defined in claim 5, further comprising respective vertically adjustable rollers provided at each support of said wheelguards and engageable with said elongated indentations of said superstructures.

7. The trailer defined in claim 6 wherein each of said rollers has the same width as the respective wheelguard support associated therewith, whereby superstructures having different cross-sectional profiles can be supported internally and externally of the cross-sectional outline thereof.

8. The trailer defined in claim 7 wherein an additional section can be mounted at said towbar for accommodating braking and reversing devices.

9. The trailer defined in claim 8, further comprising quick-locking mounting devices at said vertical support and each of the wheelguard supports for preventing said superstructures from shifting during transport.

10. The trailer defined in claim 9 wherein the rail sections of said towbar are tubular and are provided internally with additional tubular sections nested inside one another and adapted to be extended from said towbar to accommodate superstructures of different lengths.

11. The trailer defined in claim 9 wherein said towbar is detachably mounted on said trailer whereby said towbar can be exchanged with towbars of different lengths.

12. The trailer defined in claim 11, further comprising an adaptor for mounting superstructures not having said compatable configuration on said trailer.

13. The trailer defined in claim 12, further comprising a rope winch mounted at said front end for pulling said superstructures onto said trailer.

* * * * *